(12) United States Patent
Juret et al.

(10) Patent No.: US 6,984,140 B2
(45) Date of Patent: Jan. 10, 2006

(54) SMART CARD CONNECTOR WITH EJECTION SPRING

(75) Inventors: Bernard Juret, Crissey (FR); Michel Bruno, Dole (FR)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/985,468

(22) Filed: Nov. 10, 2004

(65) Prior Publication Data

US 2005/0142902 A1    Jun. 30, 2005

(30) Foreign Application Priority Data

Nov. 21, 2003  (FR)  .................................. 03 13635

(51) Int. Cl.
 *H01R 13/20* (2006.01)
 *H01R 13/62* (2006.01)
(52) U.S. Cl. ........................ 439/159; 439/153; 439/331
(58) Field of Classification Search ................ 439/159, 439/153, 155, 328, 630, 923, 331
 See application file for complete search history.

(56) References Cited

U.S. PATENT DOCUMENTS

| 4,436,269 | A | | 3/1984 | Dirksing et al. |
| 6,220,882 | B1 | * | 4/2001 | Simmel et al. ............. 439/326 |
| 6,382,995 | B1 | * | 5/2002 | Bricaud et al. ............. 439/159 |
| 6,719,579 | B2 | * | 4/2004 | Tisserand et al. ........... 439/331 |
| 6,761,575 | B2 | * | 7/2004 | Bricaud et al. ............. 439/326 |
| 2003/0068911 | A1 | | 4/2003 | Ooya et al. |

* cited by examiner

*Primary Examiner*—Chandrika Prasad
(74) *Attorney, Agent, or Firm*—Peter Van Winkle (57) ABSTRACT

A smart card connector has a housing (11) formed by an insulative contact holder (12) and a sheet metal cover (14) that has an upper plate (46) lying above an upper face of the contact holder, to form a card-receiving cavity (30) between them. A wire spring (16) has a spiral wound planar main portion (141) that is mounted to lie on the upper surface of the sheet metal upper plate (46). The wire spring has a first end portion (144) fixed to the cover and has a second end portion (158) with a right angle bend (160) leading to a downwardly-extending ejection spring part (162). The ejection spring part extends though a slot (66) in the cover upper plate portion and into the cavity to lie in the path of the card leading edge.

15 Claims, 6 Drawing Sheets

SMART CARD CONNECTOR WITH EJECTION SPRING

CROSS REFERENCE

Applicant claims priority from French patent application No. FR 0313635 filed Nov. 21, 2003.

BACKGROUND OF THE INVENTION

Smart cards, which are thin cards with electrical contact pads on one face, are used by inserting them into a cavity of a smart card connector that has contacts that engage the contact pads. The connector is typically mounted on a circuit board, which connects the contacts to read/write circuitry. There is a demand for smart card connectors that occupy a minimum of space on the circuit board, but that effectively perform the functions of enabling easy card insertion and removal.

U.S. Pat. No. 6,382,995 describes a smart connector with an insulative contact holder and a sheet metal cover, which form a card-receiving cavity between them. That patent shows a short helically wound wire spring lying in the front portion of the card-receiving cavity, the spring having a spring leg lying in the path of a card front edge. That connector includes a card retainer tab projecting from a side of the connector rear end. When the tab is depressed, the spring leg pushes the card front edge rearward far enough so a person can grasp the car and pull it the rest of the way out. One problem is that a thin wire is used to hold the helical wound part, and there is a possibility that the card will slide over or under the wire. The thin wire may not provide sufficient force. The spring takes up additional space at the front of the card, which adds to the "footprint" occupied by the connector. A connector that provided a sufficient ejection force using a wound spring, but that did not increase the footprint on the circuit board, and without a considerable danger that a card would slip over or under the spring, would be of value.

SUMMARY OF THE INVENTION

In accordance with one embodiment of the invention, a smart card connector is provided which includes a spring with a wire wound spring main portion, that applies considerable ejection force to a card in a reliable manner, and with the spring adding little if any to the footprint of the connector on a circuit board. The wire of the spring main portion is wound in a spiral and lies on the outside of the housing that forms the card-receiving cavity. The spring has a first end portion fixed to the housing, and has a second end portion with a part that extends into the cavity to press against the card front edge. The spring main portion lies in a horizontal plane that is parallel to the horizontal plane of the card-receiving cavity. The spring second end portion has a right angle bend that results in an ejection spring part that projects vertically into the card-receiving cavity with assurance that the card will not ride over or under the ejection spring part.

The housing of the cavity includes a molded insulative contact holder with an upper face, and a sheet metal cover. The cover has an upper plate that lies above and parallel to the contact holder upper face to form the cavity between them. The spring main portion lies facewise adjacent to the upper face of the upper plate. The ejection spring part initially lies against a rear end of a slot in the upper plate. The upper plate is formed with a bent-up region that forms a passage into which the spring first end portion is slid, to fix the spring first end portion to the upper plate.

The novel features of the invention are set forth with particularity in the appended claims. The invention will be best understood from the following description when read in conjunction with the accompanying drawings.

DESCRIPTION OF THE PREFERRED EMBODIMENT

1. Limited Description of the Invention

Figure 1:
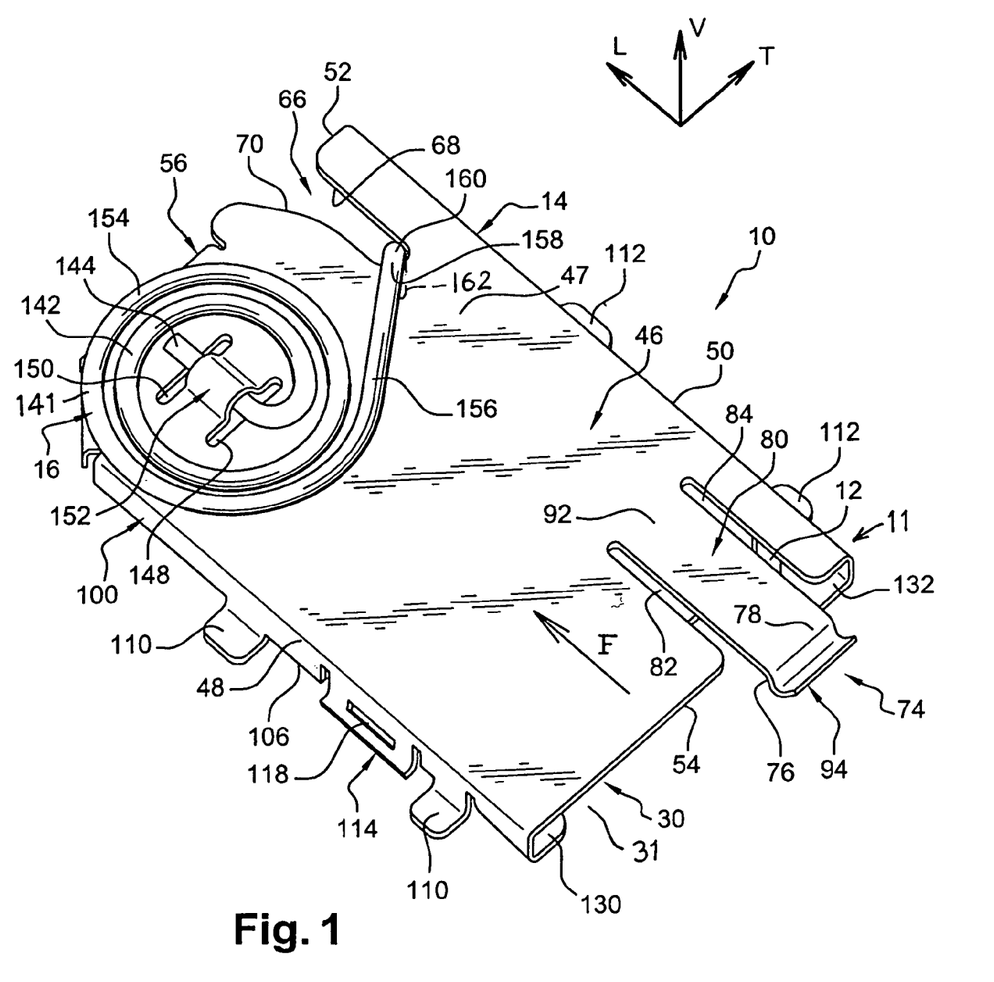
FIG. 1 is a top isometric view of a smart card connector of the invention, shown without a card.

FIG. 1 shows a smart card connector 10 of the invention, which includes a housing 11 that receives a smart card by inserting the card forwardly F into a card receiving slot, or cavity 30. The housing includes a contact holder 12 that is molded of insulative material and that holds contacts. The housing also includes a sheet metal cover 14 with a horizontal upper plate 46 and vertical opposite sides 48,50. A card is inserted forwardly F into the cavity until a rear edge of the card engages a lip 76 on a retainer 74, which occurs when the card is fully inserted. Thereafter, the card cannot be withdrawn until an actuator tab 94 on the retainer is raised to release the card. A spring 16 engages the front edge of the card to bias it rearward R. When the card is released, the spring moves the card rearward by perhaps one centimeter. Then, enough of the card projects rearward of the upper plate rear edge 54 that the card rear end can be grasped to pull the card completely out of the cavity.

Figures 2, 3:
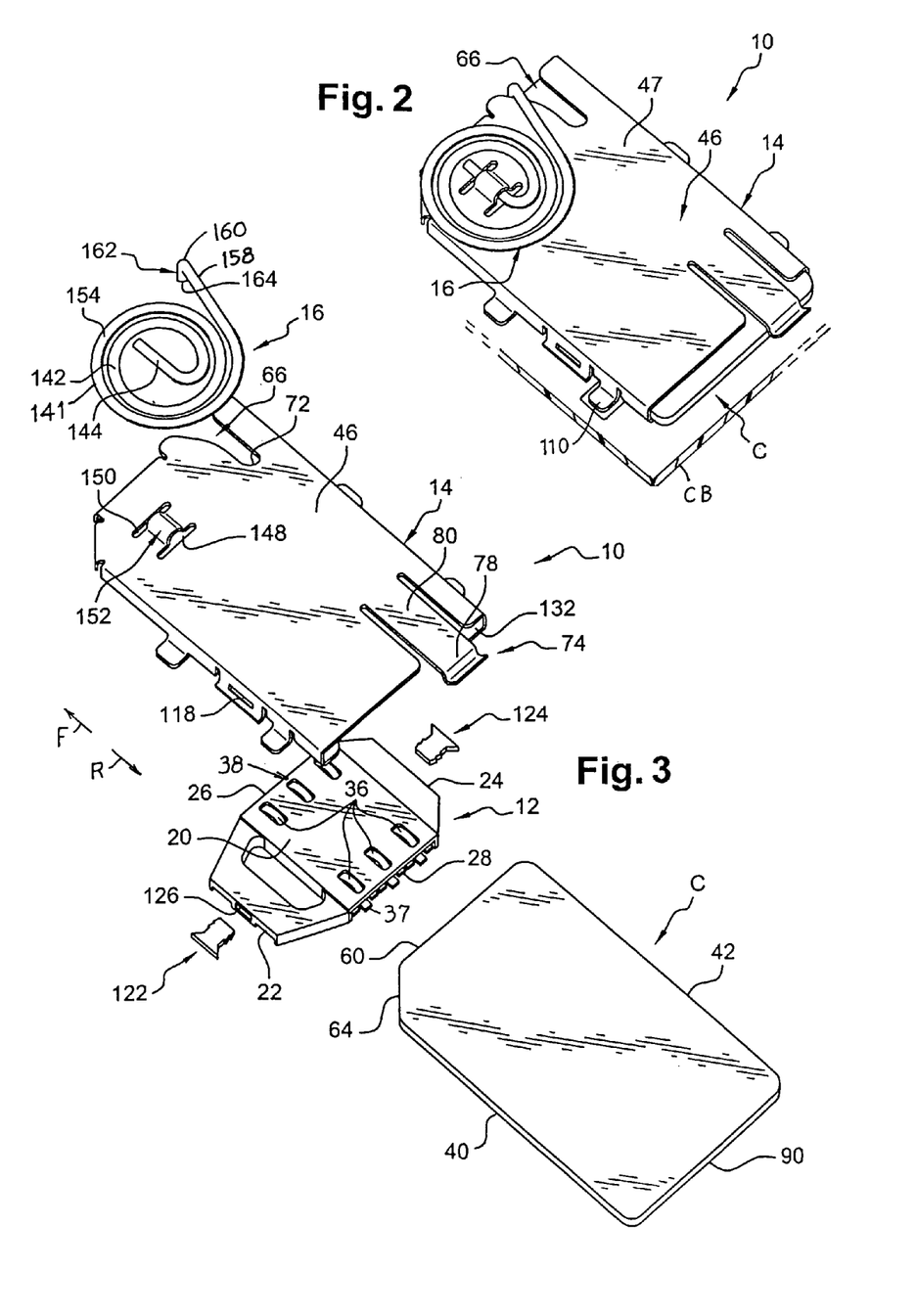
FIG. 2 is a view similar to that of FIG. 1, but with a card fully installed in the connector and with the connector mounted on a circuit board.
FIG. 3 is a top exploded isometric view showing the main components of the connector with card of FIG. 2.
Figure 4:
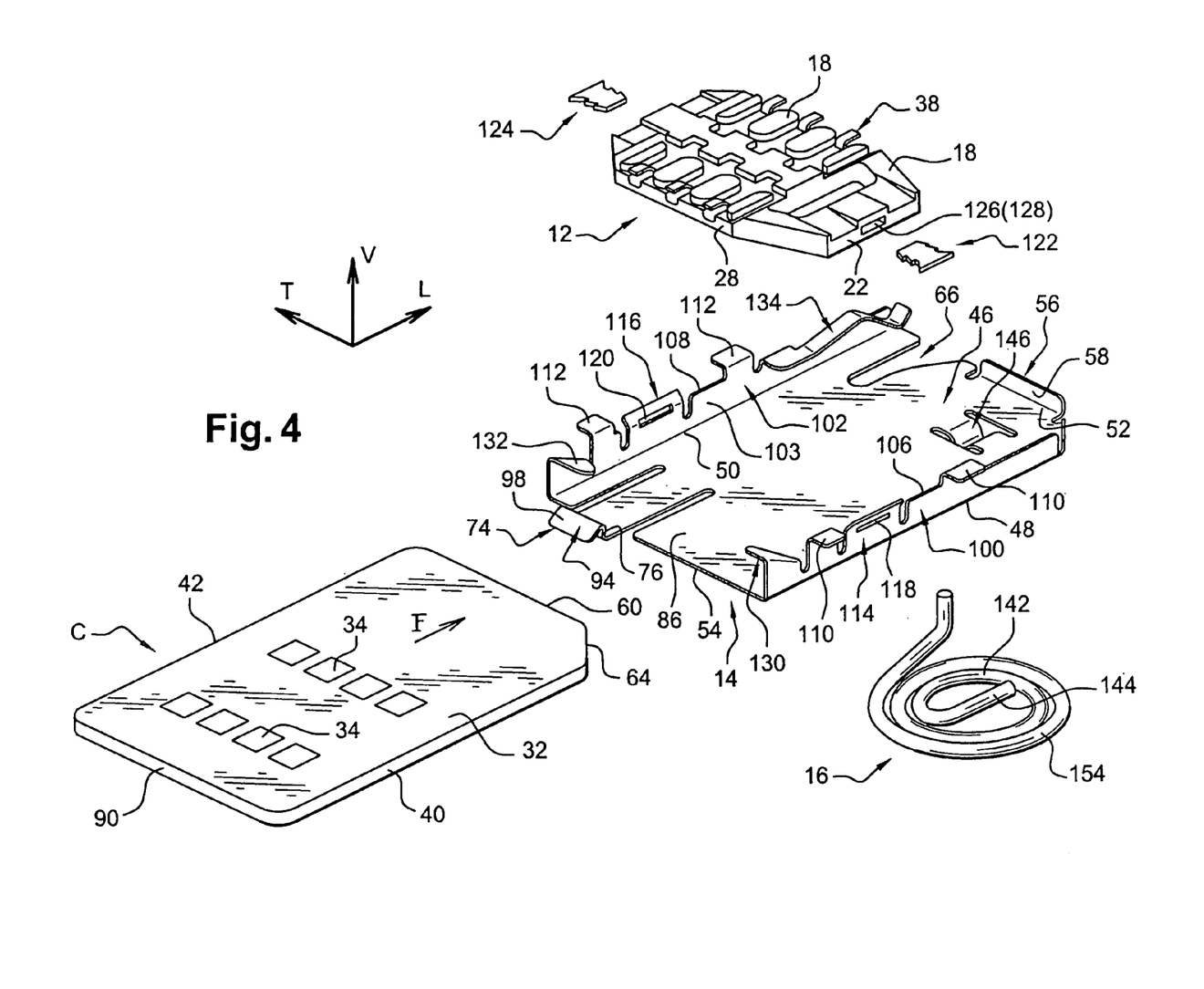
FIG. 4 is a rear bottom exploded isometric view of the components shown in FIG. 3
Figure 5:
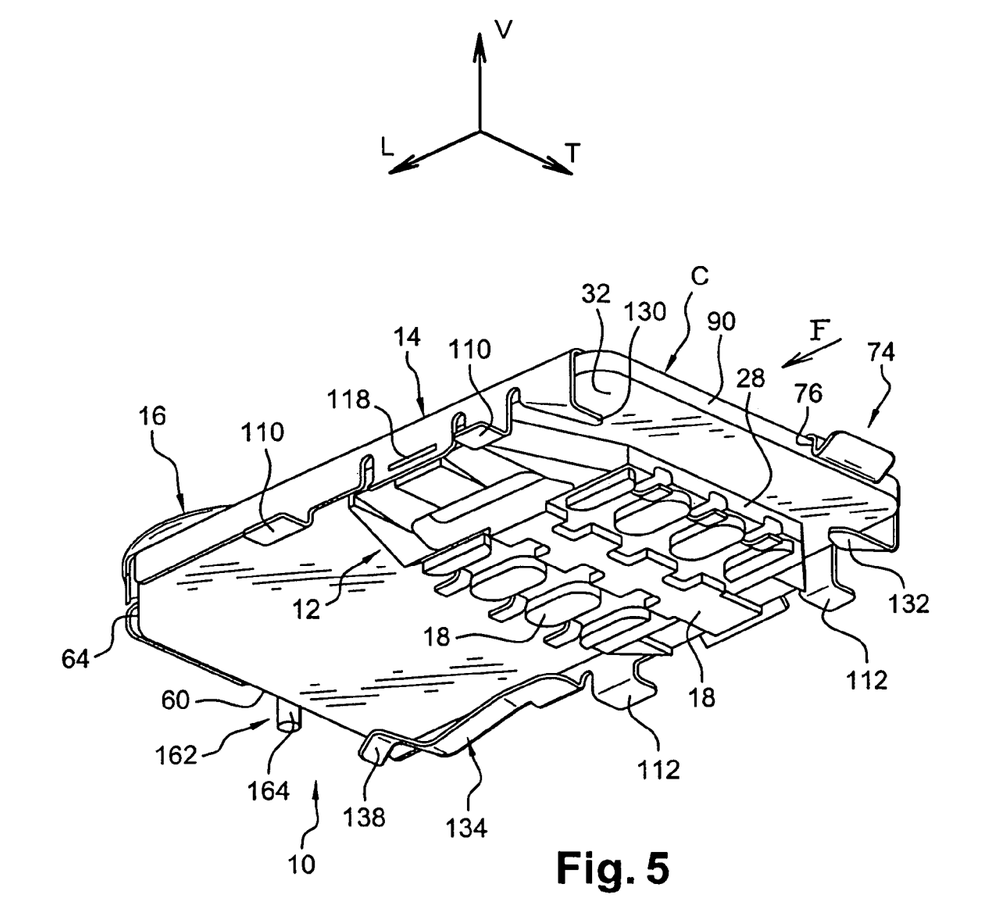
FIG. 5 is a front bottom isometric view of the assembled connector with card of FIG. 2.

FIG. 3 shows the upper face 20 of the card holder 12 and shows the pad-engaging parts 36 of the contacts 38 that engage contact pads on the card C. The card-receiving cavity rear portion lies between the contact holder and the cover upper plate. The cavity has a thickness about equal to the thickness of the card. The lower face of the card is shown in FIG. 4, which shows the contact pads 34. The contacts have tails 37 (FIG. 3) that are soldered to traces on a circuit board CB shown in FIG. 2. The cover opposite sides have tabs such as 110 that are soldered to other traces of the circuit board to mount the connector on the board.

The spring 16 has a main portion 141 that is wound in a flat spiral, an inner or first end portion 144 that is fixed to the cover, and an outer or second end portion 158. The second end portion 158 has an approximately 90° bend 160 that results in an ejection spring end part 162 that extends downward into and though the card-holding cavity. As a card approaches full insertion into the card-holding cavity, the front edge 60 of the card engages the ejection spring part 162 of the spring and moves it largely forward until the card reaches its fully installed position. The spring ejection part 162 moves along a slot 66 in the cover upper plate. As mentioned above, when the card is released so it can move rearward, the spring end part 162 pushes the card rearward. The spring end part moves rearward until it is stopped by a rear end 72 of the slot.

As shown in FIG. 1, the spring main part 141 that extends in a flat spiral, lies facewise adjacent to the upper surface 47 of the cover upper plate 46. The spring first end portion 144 lies at the middle of the spiral and is fixed to the upper plate. Such fixing is accomplished by forming a pair of slits 148, 150 in the upper plate and forming an upwardly-bent region 152 between the slits. The spring first end portion 144 is slid under the region 152 and is held in place by downward force applied by the bent region 152 and upward forces applied by upper plate portions lying immediately beyond the slits 148, 150.

An important advantage of the spring 16 with its downwardly-extending ejection spring end part 162, is that the card cannot slip under or over the ejection spring end part. The part 162 extends down through at least part of the cavity that is more than half the card thickness, and preferably extends completely though and below the card thickness of the card-receiving cavity 30. The spring wire of the ejection spring end part has a vertical surface that engages the card, rather than a rounded horizontal surface that a card edge might ride over or under. In addition, a spring wire spiral main part 141 is provided which is of large diameter, of at least one-third the card width in direction T, to provide a reliable ejection force, without increasing the length of the connector. The circuit board on which the connector is mounted, often requires space for other components, and it is desirable that the connector occupy a minimum "footprint", or area of the circuit board. By placing the wound spiral main portion 141 of the spring against the upper plate, applicant does not increase the footprint, and applicant increases the height of the connector only slightly.

Figure 6:
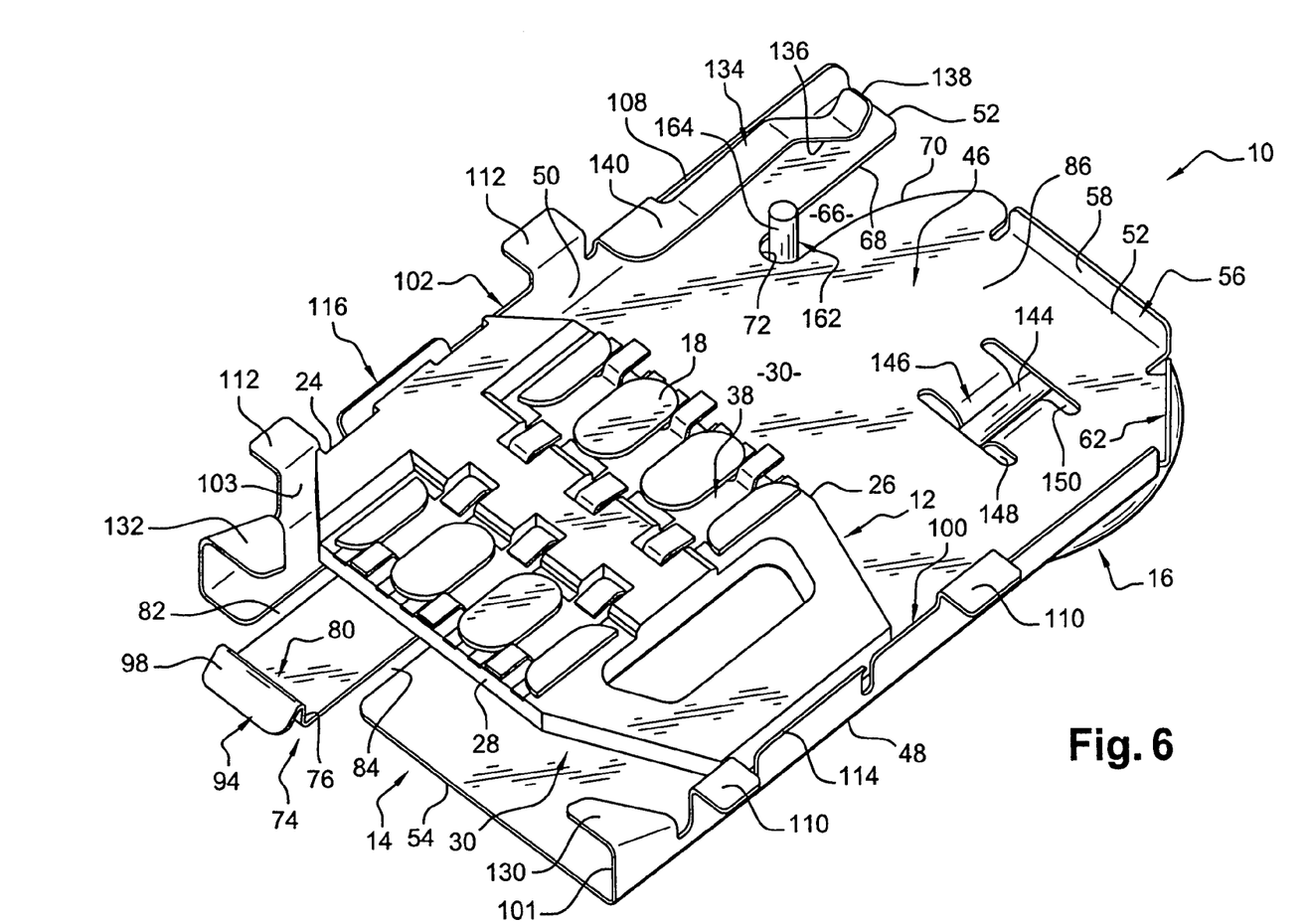
FIG. 6 is a rear bottom isometric view of the connector of FIG. 5, without a card.

FIG. 6 shows that the slot 66 has a straight longitudinally-extending side 68 and has a curved opposite side 70. The curvature of slot side 70 is largely convex about the center of the wound spiral main portion, and follows the path that the ejection spring end part 164 tends to take. The slot 66 is of minimum area to minimize the decrease in upper plate strength resulting from the presence of the slot.

The actuator tab 94 on the retainer 74 shown in FIG. 1, extends rearward from the rear end of the connector. This allows a person's finger that lifts the tab 94 to sense the rear end or edge of the card that is being ejected, and grasp it between fingers of the same hand. This avoids the need to use two hands to eject the card (one to lift the retainer and one to sense the rear of the card and grasp it).

FIG. 4 shows that the sides of the sheet metal cover have tabs 114, 116 with slots 118, 120. The contact holder has holes 126, 128 at its opposite sides. When the slots in the cover side tabs and the holes in the contact holder are aligned, a pair of keys 122, 124 are inserted though the slots and holes to fix the cover and contact holder together.

Although terms such as "downward" and "upward" have been used to help in the description of the invention, it should be understood that the connector can be used in any orientation.

Thus, the invention provides a smart card connector of a type that has a card-receiving cavity, a retainer that holds a fully inserted card in position, and a spring that urges the card to move rearwardly when the retainer is operated to release the card, which assure reliable operation with a connector of small footprint on a circuit board. The spring has a flat wound spiral portion that lies facewise against the upper plate of the cover. The spring has a first end portion fixed to the cover, and has a second end portion with a bend that is about a right angle and that forms an ejection spring part that extends downward. The ejection spring part extends down into, and preferably completely across the thickness of the card-receiving cavity. The ejector preferably includes an activator tab that lies rearward of the card-receiving cavity. The card holder and cover can be fixed together by holes or slots in each that can be aligned and then receive keys that hold the cover and contact holder together.

2. Detailed Description of the Invention

The device or connector 10 illustrated in the figures essentially consists of a lower insulating support, or contact holder, in the form of a horizontal molded plastic plate 12, an attached upper cover 14, which is a metal part, for example made of cut, folded and/or stamped sheet metal, and an upper ejection spring 16.

The device 10 is designed to receive a card C, which is an integrated-circuit card, for example of the MICROSIM type illustrated in the figures.

The support 12 is a molded part with the general shape of a rectangular parallelepipedal plate, which is bounded vertically by a lower plane face 18 and an upper plate face 20.

The lower plate 12 is also bounded transversely by two longitudinal edges 22 and 24 and is bounded longitudinally by a front transverse edge 26 and by a rear transverse edge 28.

The lower plate 12 made of insulating material defines, with the attached upper cover 14, a cavity 30 which has a shape complementary to that of the card C and is intended to at least partly house the latter, the lower face 32 of which has conducting pads 34 which, when the card C is in the inserted position—or contact position—in the cavity 30 of the device, are in contact with the free contact ends 36 belonging to contact blades, or contacts 38 carried by the lower plate 12.

The cavity 30 is generally open longitudinally at the rear. The cavity 30 is bounded transversely by the parallel opposed internal faces 101 and 103 of the sides, or longitudinal lateral flanges 100 and 102 of the upper cover 14, which are spaced apart transversely by a distance corresponding approximately to the width of the card C, so as to guide the opposed parallel longitudinal edges 40 and 42 of the latter during its longitudinal insertion, from the rear forwards along the direction F, into the cavity 30.

The cavity is bounded vertically downwards by the horizontal upper face 20 of the lower plate 12.

The upper cover 14 essentially consists of a horizontal upper plate 46 which has a generally rectangular shape and is bounded transversely by two opposed parallel longitudinal edges 48 and 50 and is bounded longitudinally by a front transverse edge 52 and by a rear transverse edge 54.

Figure 7:
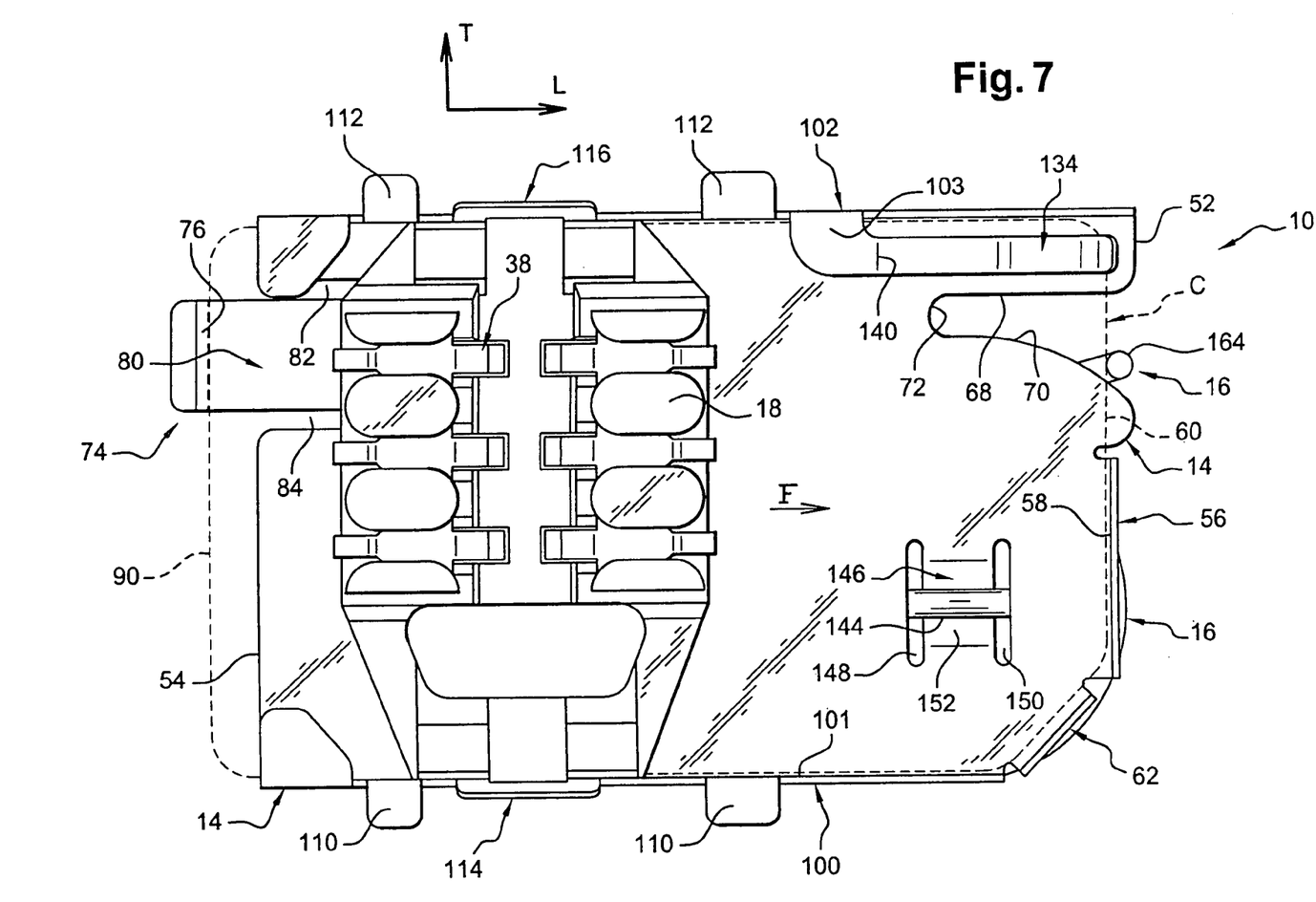
FIG. 7 is a bottom plan view of the connector of FIG. 6, with a card indicated in phantom lines.

The overall dimensions of the upper plate 46 are such that, as may be seen in FIG. 7, it covers substantially all of the card C, whereas the overall length of the lower plate 12 between its transverse edges 29 and 28 is considerably less, and around one-third of the length of the card.

The front transverse edge 52 of the plate 46 is extended vertically downwards by a folded-over front transverse sheet 56 the rear internal face 58 of which constitutes a longitudinal mechanical stop face that defines the cavity 30 longitudinally towards the front and against which the card C butts, via its front transverse edge 60, in order to define its inserted and contact position in the device 10, and especially with respect to the lower plate 12 that bears the contact elements that cooperate with the pads 34 on the lower face 32 of the card C.

The front transverse edge 52 is also extended vertically downwards by a folded-over edge 62, which constitutes a cut corner at approximately 45° relative to the longitudinal direction F of insertion of the card C into the cavity 30, and this 45° inclination corresponds to that of the standardized cut corner 64 formed in the front transverse edge 60 of the MICROSIM card. Thus, the 45° folded-over edge 62 constitutes a polarization means for the correct sense and orientation of the card C in the device 10.

The folded-over edge 62 and the transverse sheet 56 do not extend over the entire transverse width of the edge 52 and the free part of the latter includes a cut-out or slot 66 that emerges longitudinally towards the front and is bounded transversely by a straight longitudinal edge 68 and by a convex circularly arcuate longitudinal edge 70, the rear ends of the two edges 68 and 70 being joined together by a transverse rear end edge 72 in the form of a concave semicircle, which defines the slot 66 longitudinally rearwards.

The retractable means 74 for retention of the card C in the cavity 30 consists here of a retention spur or lip 76 which is placed at the rear free end 78 of a carrier arm 80 that is produced as a single part with the upper plate 46 of the cover 14.

More particularly, the carrier arm 80 is a portion of the upper plate 46 and is formed, in the said plate, by means of two straight parallel longitudinal slots 82 and 84 that extend forwards from the rear transverse edge 54 of the upper plate 46.

The L-shaped retention lip 76 is also produced as one part with the rear free end 78 of the arm 80, being jointed horizontally to the latter.

In its free state and when a card is in the inserted contact position, the retention lip 76 extends below the plane of the internal lower face 86 of the upper plate 46 so that its front transverse edge constitutes a stop facet that extends vertically into the cavity 30 and faces the rear transverse edge 90 of the card C.

The carrier arm 80 behaves in the manner of an elastically deformable beam, which can flex vertically, from its free rest state, especially upwards, the "hinge" of the carrier arm 80 consisting of a region 92 located near the front base of the carrier arm 80.

In order to intentionally cause elastic deformation of the carrier arm 80 from its free rest state, this arm is provided with a gripping or actuating tab 94 which extends longitudinally rearwards beyond the lip 76.

The gripping or actuating tab 94 thus allows the carrier arm 80, and therefore the retractable retention lip 76, to rise vertically so that it no longer extends vertically inside the cavity 30 facing the rear transverse edge 90 of the card C when the latter is in position in the device 10.

The rear free end edge 98 of the carrier arm 80 constitutes a cam profile—in the form of a chamfer or inclined corner—which cooperates with the front transverse edge 60 of the card C when the latter is inserted longitudinally, from the rear forwards, so as to make the retention lip 76 automatically move away by elastic deformation of the carrier arm 80.

In particular in order for the metal cover 14 to be mounted on and fastened to the insulating support 12—in its mounted position, which is illustrated in particular in FIGS. 2 to 5 and 7—the cover 14 includes the cover opposite sides, or two folded-over longitudinal flanges 100 and 102 which extend vertically downwards from the longitudinal edges 48 and 50 of the upper plate 46, along the external vertical longitudinal faces 22 and 24 of the lower plate 12.

The longitudinal lower edges 106 and 108 of the flanges 100 and 102 include horizontal tabs 110 and 112 which extend transversely outwards and are tabs for fastening the cover 14—and therefore the device 10—to the upper face of a printed-circuit board (PCB), which is not shown, by soldering or brazing.

The lateral sides or flanges 100 and 102 of the cover 14 also include, in their rear half, two tabs 114 and 116 for mounting and fastening the lower plate 12 that carries the contact elements.

Near its lower longitudinal edge, each mounting tab 114 has a horizontal slot 118, 120 of longitudinal orientation, each slot of which allows passage of a key 122, 124 for mounting and fastening the lower plate 12, each of the external lateral faces 22, 24 of which plate has a complementary hole 126, 128 produced when molding the insulating plastic body constituting the lower plate 12.

Thus, in order for the cap or cover 14 to be mounted on and fastened to the plate 12, the cover 14 is placed, vertically downwards when considering FIG. 3, on top of the plate 12 and then the keys 122 and 124 are inserted transversely through the slots 118 and 120 so that they are then housed in the holes 126 and 128, each key being prevented from moving transversely thanks to barbs formed on each of the transverse edges of each key, which "catch" in the corresponding hole 126 and 128.

The plate 12/cover 14 assembly operation may be carried out before the device 10 is mounted on a printed-circuit board (PCB) of an electronic apparatus, so as to form a single entity.

The mounting operation may also consist in fastening, in a known manner, by soldering or brazing, firstly the plate 12 to the printed-circuit board, then in placing the cover 14 on top of the plate 12 and fastening the cover 14 by means of the keys 122 and 124.

Each lateral flange 100, 102 has, at its rear longitudinal end, a branch 130, 132 which is folded over transversely inwards and is inclined downwards relative to the horizontal plane so as to constitute a slideway for guiding the card in order to facilitate its insertion into the cavity 30.

Finally, the cover 14 has, at its right front longitudinal end, a longitudinal tab 134 which is folded transversely inwards and can move vertically under the action of the front transverse edge 60 of the card C so as to constitute the moving contact of a switch for detecting the presence of a card in the inserted position.

For this purpose, the moving contact 134 comprises a ramp 136 with which the edge 60 of the card cooperates, and its front free end edge 138 is, when a card C is present, capable of coming into contact with a corresponding track on the printed-circuit board (PCB) on which the device 10 is mounted in order to establish an electrical switch.

The contact 134 operates, like the arm 80, in the manner of a longitudinal electrical beam whose pivot axis is located at its rear longitudinal end 140.

According to the teachings of the invention, the spring 16 for ejecting the card out of the cavity 30 of the device 10 is a spring made of wire of circular cross section, produced by bending, the said spring being placed on the outside of the device 10, above the upper plate 46 of the cover 14.

As may be seen in the figures, the spiraled spring 16 here has two complete circular turns that lie in the same horizontal plane and are adjacent to the upper face 47 of the upper plate 46.

The radially innermost turn 142 is extended by a free first end portion 144 which has a diametral orientation and is, in the embodiment illustrated in the figures, in the mounted position of the spring 16, oriented longitudinally.

This end 144 is housed, by interlocking, in a complementary receptacle 146 formed in the upper plate 46, near the front longitudinal end of the latter, by means of a plunged boss which is bounded by two cut parallel transverse slots, a rear 148 and a front 150, the plunged boss being produced by upward drawing so as to form an upper half-loop 152 of semicircular cross section complementary to the circular cross section of the constituent wire of the spring 16.

The dimensions of the receptacle 146 are such that, in the mounted position, the spring 16 is pressed horizontally onto the upper face 47 of the upper plate 46 of the cover 14.

The mounting operation is effected by elastic deformation of the strand 144 downwards out of the plane of the turns in order to insert it into the half-loop 152, then the strand is inserted and finally held captive when the turns bear on the face 47.

The second, radially outermost, turn 154 is extended tangentially and horizontally by a connecting strand or portion 156 that extends generally at 45° towards the front and the free end 158 of which is extended by a right-angled or 90° bend 160 in order to be extended by a vertical ejection spring part or strand 162 that extends vertically downwards inside the cavity 30 and is housed in the slot 66.

The design of the spring 16 is such that, in the mounted and rest position, that is to say in the absence of the card C, the rear convex cylindrical lateral wall of the main ejection strand 162 is urged, by prestressing, against the end wall 72 of the slot 66, that is to say it is permanently urged elastically towards this rest position.

The lower free end portion 164 of the strand 162 constitutes the active portion of the ejection spring 16 with which the front transverse edge of the card C cooperates when the latter is inserted into the device 10.

Thus, referring to FIG. 7, the insertion of the card in the direction F firstly causes the lip 74, 76 of the arm 80 to retract, until the front transverse edge 60 reaches the dimension of the end wall 72 of the slot 66, and therefore the portion 164.

The user then continues to apply the insertion force, from left to right, against the turn force or ejection force exerted by the strand 164 of the ejection spring 16, which is progressively strained while still pushing longitudinally forwards onto the strand 164.

The movement of the strand 164 takes place generally along the longitudinal direction, from the rear forwards, and along a circularly arcuate path approximately parallel to the profile of the convex circular longitudinal edge 70 of the cut-out 66.

During the insertion, the active portion 164 also moves slightly transversely along the transverse front end edge 60 of the card C.

The insertion is completed when the card C has reached its inserted position shown by the dotted lines in FIG. 7, in which it is held in place by the lip 74, 76 which then lies facing the rear transverse edge 90.

The card is automatically ejected by retracting, vertically upwards, the retention lip 76 and through the action of the active portion 164 of the ejection spring 16, which cooperates with the front transverse edge 60 in order to eject the card C longitudinally rearwards.

As may be seen in particular in FIG. 7, the design according to the invention is particularly advantageous insofar as the device 10 hardly extends longitudinally forwards beyond the front transverse edge 60 of the card, that is to say its dimension in this direction corresponds to its position of the front transverse edge 60 to which the diameter of the wire of the active portion 164 of the ejection spring 16 is added, while still having a very high ejection force.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A smart card connector for receiving a smart card that has a front edge, said connector comprising a housing that includes a contact holder of insulating material and a plurality of contacts mounted on said contact holder, said housing also comprising a cover with an upper plate lying over said contact holder, said contact holder and cover forming at least part of a card-receiving cavity between them wherein said cavity has a rear end into which a front edge of card is inserted and moved forwardly to a fully inserted position, and said connector includes an ejection spring that urges a fully inserted card rearwardly and also includes an activatable retainer that retains a fully inserted card and that is activatable to release the card and allow it to move rearwardly, wherein:

said spring has a main portion that lies outside said cover and has an outer end portion that extends into said cavity and that has an ejection spring part that is positioned to be deflected forwardly by the front edge of the card.

2. The connector described in claim 1 wherein:

said cover has a cover slot that extends at least partially in forward and rearward directions and that has a cover slot rear end, and said spring is formed of wire, and said spring outer end portion projects through at least part of a thickness of said cover slot, is biased against said cover slot rear end, and is moveable largely forwardly from a location against said cover slot rear end.

3. The connector described in claim 2 wherein:

said spring outer end portion extends below said upper plate by a distance that is at least equal to a thickness of said card.

4. The connector described in claim 1 wherein:

said spring is formed of wire, and said spring main portion includes a flat spiral wound part of said wire that lies facewise adjacent to said cover on a face thereof that is opposite said card-receiving cavity.

5. The connector described in claim 4 wherein:

said flat spiral wound part has a diameter that is at least one-third the distance between transversely-spaced opposite sides of said slot.

6. The connector described in claim 1 wherein:

said spring main portion is wound into a flat spiral, said spring has an inner wire end portion that lies at a middle of said flat spiral and that is fastened to said cover upper plate, said spring outer end portion has a right angle bend, and a part of said spring outer end portion beyond said right angle bend extends through a slot in said cover upper plate into said cavity.

7. The connector described in claim 6 wherein:

said cover is formed of sheet metal and has an upper face, and said flat spiral of said spring main portion lies against said cover upper face;

said cover upper face has an upwardly-bent region, and said inner wire end portion has a part that lies under said upwardly-bent region.

8. The connector described in claim 1 wherein said cover is formed of sheet metal, and a rear portion of the cover has at least one slit that forms a retainer strip with a largely forwardly-facing shoulder that engages a rear end of the card to retain it until the retainer strip is lifted, wherein:

said retainer strip has a rear end that extends rearward of said cavity and that forms a handle that lies rearward of said cavity and that can be manually lifted.

9. The connector described in claim 1 wherein said cover is formed of sheet metal, and wherein:

said cover has a pair of sheet metal sides depending from opposite sides of the upper plate, said sides each having a slot;

said insulative contact holder has opposite sides that are joined to said tabs by keys that each projects through one of said slot.

10. The connector described in claim 1, wherein said cover is formed of sheet metal, and wherein:

said cover has a pair of sheet metal sides depending from opposite sides of the upper plate;

said sheet metal sides have lower ends with mounting tabs projecting in opposite directions away from said contact holder, for mounting on a circuit board.

11. A smart card connector for receiving a smart card that has contact pads and that has a front edge, which comprises a housing that includes an insulative contact holder and a sheet metal cover, said contact holder having an upper face lying in a first plane and said cover having an upper plate that lies above said contact holder upper face and that has a cover plate lower face portion lying in a second plane that is parallel to said first plane and that forms at least a portion of a card-receiving cavity between them into which the smart card front edge is inserted forwardly, along a path to a fully inserted card position, including:

a spring wire that has a spiral main portion that is wound into a spiral and that has first and second opposite wire end portions, said spiral main portion lying outside said card-receiving cavity in a third plane that is parallel to said first and second planes, and said first wire end portion is fixed to said housing;

said second wire end portion has an approximately right angle bend forming an ejection spring part that lies beyond the bend and that projects into said card-receiving cavity and that lies in the path of the card front edge that is inserted forwardly to urge the card rearwardly.

12. The connector described in claim 11 wherein:

said spiral main portion lies on top of an upper face of said cover upper plate, said upper plate has a slot in it that extends at least partially in forward and rearward directions, and said second wire end portion extends downwardly through said slot into said card-receiving cavity.

13. The connector described in claim 12 wherein:

said slot has a side that is convexly curved.

14. The connector described in claim 11 wherein:

said cover upper plate has a primarily planar portion and said spiral main portion lies on said planar portion;

said cover upper plate has a wire-holding portion that is bent upwardly out of the plane of said planar portion and that holds said spring first wire end portion.

15. The connector described in claim 11 wherein:

said spring spiral main portion has a diameter that is at least one-third of a transverse width of said slot in a direction perpendicular to said path of the smart card front edge.

* * * * *